United States Patent [19]

Tsutsui et al.

[11] Patent Number: 5,301,205
[45] Date of Patent: Apr. 5, 1994

[54] APPARATUS AND METHOD FOR DATA COMPRESSION USING SIGNAL-WEIGHTED QUANTIZING BIT ALLOCATION

[75] Inventors: Kyoya Tsutsui; Kenzo Akagiri, both of Kanagawa, Japan

[73] Assignee: Sony Corporation, Tokyo, Japan

[21] Appl. No.: 11,376

[22] Filed: Jan. 29, 1993

[30] Foreign Application Priority Data

Jan. 29, 1992 [JP] Japan ................................. 4-036952

[51] Int. Cl.⁵ .............................................. H04K 1/00
[52] U.S. Cl. ........................................ 375/1; 380/46
[58] Field of Search ................................ 375/1; 380/46

[56] References Cited

U.S. PATENT DOCUMENTS

| | | | |
|---|---|---|---|
| 4,184,049 | 1/1980 | Crochiere et al. | 381/31 |
| 4,455,649 | 6/1984 | Esteban et al. | 381/31 X |
| 4,535,472 | 8/1985 | Tomeik | 381/31 |
| 4,870,685 | 9/1989 | Kadokawa et al. | 381/31 |
| 4,885,790 | 12/1989 | McAulay et al. | 381/36 |
| 4,896,362 | 1/1990 | Veldhuis et al. | 381/41 |
| 4,932,062 | 6/1990 | Hamilton | 381/46 |
| 4,972,484 | 11/1990 | Thiele et al. | 381/37 |
| 5,049,992 | 9/1991 | Citta et al. | 358/140 |
| 5,109,417 | 4/1992 | Fielder et al. | 381/29 |
| 5,115,240 | 5/1992 | Fujiwara et al. | 341/51 |
| 5,117,228 | 5/1992 | Fuchigami et al. | 341/51 |
| 5,134,475 | 7/1992 | Johnston et al. | 375/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiyama | 341/155 |
| 5,231,484 | 7/1993 | Gonzales et al. | 358/133 |

FOREIGN PATENT DOCUMENTS

| | | | |
|---|---|---|---|
| 0145788A1 | 6/1985 | European Pat. Off. | H04B 12/02 |
| 0255111A2 | 2/1988 | European Pat. Off. | G11B 20/10 |
| 0409248A2 | 1/1991 | European Pat. Off. | H03M 7/30 |
| 0420745A2 | 4/1991 | European Pat. Off. | H04B 1/66 |
| 0423050A1 | 4/1991 | European Pat. Off. | H04B 1/66 |
| 0525809A2 | 2/1993 | European Pat. Off. | H04B 1/66 |

OTHER PUBLICATIONS

Brandenburg et al., "Aspec: Adaptive Spectral Entropy Coding of High Quality Music Signals," Audio Engineering Society Preprint No. 3011 (Feb. 1991).

Davidson et al., "Low Complexity Transform Coder for Satellite Link Applications" Audio Engineering Society Preprint No. 2966 (Sep. 1990).

Esteban et al., "Application of Quadrature Mirror Filters To Split Band Voice Coding Schemes," Record of the 1977 ICASSP, pp. 191-195 (May 1977).

Johnston, "Transform Coding of Audio Signals Using Perceptual Noise Criteria," 6 IEEE Trans. on Selected Areas in Communications, 314-323 (Feb. 1988).

Rothweiler, "Polyphase Quadrature Filters-A New Subband Coding Technique," 3 Proc. 1983 ICASSP 1280-1283 (Apr. 1983).

Schroeder et al., "High Quality Digital Audio Encoding with 3.0 Bits/Sample Using Adaptive Transform Coding," Audio Engineering Society Reprint No. 2321 (Mar. 1986).

Stoll et al., "Masking-Pattern Adapted Sub-Band Coding: Use of the Dynamic Bit-Rate Margin," Audio Engineering Society Preprint No. 2585 (Mar. 1988).

Thiele et al., "Low Bit-Rate Coding of High-Quality Audio Signals - An Introduction to MASCAM System," 230 EBU Technical Review 71-93 (Aug. 1988).

Y. Mahieux & J. P. Petit, "Transform Coding of Audio Signals at 64 kbit/s," Globecom 90, vol. 1, pp. 518-522 (Dec. 1990).

Primary Examiner—David C. Cain
Attorney, Agent, or Firm—Limbach & Limbach

[57] ABSTRACT

A data compression apparatus for compressing a digital input signal to provide a compressed digital output signal. In the apparatus, a circuit derives plural spectral coefficients from the digital input signal, and groups the spectral coefficients into bands. An adaptive bit allocation circuit adaptively allocates a number of spectrum-dependent quantizing bits among the bands to allocate to each band a number of spectrum-dependent quantizing bits for quantizing each of the spectral coefficients in the band. The number of spectrum-dependent quantizing bits allocated to each band by the adaptive bit allocation circuit is determined according to the band magnitude, weighted depending on the band frequency.

65 Claims, 6 Drawing Sheets

≈300Hz

≈300Hz

APPARATUS AND METHOD FOR DATA COMPRESSION USING SIGNAL-WEIGHTED QUANTIZING BIT ALLOCATION

FIELD OF THE INVENTION

This invention relates to an apparatus for compressing digital information signals wherein a digital input signal is compressed using adaptive bit allocation.

BACKGROUND OF THE INVENTION

A variety of techniques for compressing digital audio or voice signals are known. For example, sub-band coding, a non-block-forming frequency band dividing system, in which the input audio signal is not divided in time into blocks, but is divided in frequency by a filter into plural frequency bands for quantization. In a block-forming frequency band dividing system, such as a transform encoding system, the input audio signal in the time domain is converted into spectral coefficients in the frequency domain by an orthogonal transform. The resulting spectral coefficients are divided into plural frequency bands, and the spectral coefficients in each band are quantized. There is also known a technique consisting of a combination of sub-band coding and transform coding, in which frequency range signals produced by dividing the input audio signal in frequency are individually orthogonally transformed into spectral coefficients. The spectral coefficients are then divided into plural frequency bands, and the spectral coefficients in each band are then quantized.

Among the filters useful for dividing a digital audio input signal into bands is the quadrature mirror (QMF) filter, which is described, for example, in R. E. Crochiere, *Digital Coding of Speech in Sub-bands*, 55 BELL SYST. TECH. J. No. 8, (1976). The technique of dividing the audio input signal in frequency into frequency bands of an equal width is discussed in Joseph H. Rothweiler, *Polyphase Quadrature Filers-a New Sub-band Coding Technique*, ICASSP 83, BOSTON (1983).

Among the techniques for carrying out an orthogonal transform, it is known to divide the digital audio input signal in time into blocks of a predetermined number of samples and having a predetermined duration, and to process each block using a fast Fourier transform, a discrete cosine transform, or a modified discrete cosine transform (MDCT) to convert the signal in the time domain into a signal in the frequency domain. A description of the MDCT may be found in J. P. Princen & A. B. Bradley, *Sub-Band/Transform Coding Using Filter Bank Designs Based on Time Domain Aliasing Cancellation*, ICASSP 1987 (1987).

As a technique for quantizing the respective spectral coefficients obtained by frequency division, a sub-band system which takes the characteristics of the human sense of hearing into account is known. The audio signal may be divided in frequency into plural bands, such as 25 critical bands, which have a bandwidth that increases with increasing frequency. When the spectral coefficients in each of the respective bands are quantized, the spectral coefficients are quantized by adaptive bit allocation applied to each band. For example, when quantizing the spectral coefficients resulting from an MDCT, the spectral coefficients are divided into bands and the spectral coefficients in each band are quantized using an adaptively-determined number of bits.

Among known adaptive bit allocation techniques, two will be discussed. First, in the technique described in ASSP-25, IEEE TRANSACTIONS OF ACOUSTICS, SPEECH, AND SIGNAL PROCESSING, No. 4, August 1977, bit allocation is carried out on the basis of the magnitude of the signals of the respective bands. Although this system provides a flat quantization noise spectrum, and minimizes noise energy, the actual noise perceived by the listener is not minimized because this technique does not exploit the masking characteristics on the human sense of hearing.

On the other hand, the technique described in M. A. Kransner, *The Critical Band Coder-Digital Encoding of the Perceptual Requirements of the Auditory System*, ICASSP 1980, uses the masking characteristics of the human sense of hearing to determine the signal-to-noise ratio necessary for each band in making a fixed quantizing bit allocation. However, this technique provides relatively poor results with a single sine-wave input because the bit allocation remains fixed.

To overcome the above-mentioned drawbacks in the bit allocation techniques discussed above, the data compression apparatus described in U.S. patent application Ser. No. 07/924,298, the specification of which is incorporated herein by reference, has been proposed. In this apparatus, the total number of bits available for quantizing all the spectral coefficients resulting from orthogonally transforming a digital input signal is divided between bits to be allocated according to the level of the input signal (level-dependent bits) and bits to be allocated according to the spectral distribution of the input signal (spectrum-dependent bits). A total number of bits, consisting of level-dependent bits and spectrum-dependent bits, is allocated to each band. Each spectral coefficient in the band is quantized with the allocated number of bits. The total number of bits allocated for quantizing each spectral coefficient in each band is the sum of the number of level-dependent bits allocated to the band and the number of spectrum-dependent bits allocated to the band.

The division ratio of the total available number of quantizing bits between level-dependent bits and spectrum-dependent bits can be variable, depending on a signal related to the input signal such that, the smoother the spectrum of the input signal (i.e., the less tonal the input signal), the larger is the division ratio in favor of level-dependent bits. For each block of the digital audio input signal, the number of level-dependent bits allocated for quantizing the each of the spectral coefficients in each band is determined according to one of plural predetermined bit allocation patterns selected according to the level of the input signal. The number of spectrum-dependent bits allocated for quantizing the spectral coefficients in each band corresponding to each block of the digital audio input signal depends on the band magnitude of each band. The band magnitude can be any one of the energy of the band, the peak level in the band, the integrated level over the band, or some other suitable parameter relating to the band.

If the energy of the input signal is concentrated in particular spectral regions, as in the case of a single sine wave input, the quantizing bit allocation technique just described enables the number of bits allocated to bands containing high levels of spectral energy to be increased to improve the overall signal-to-noise characteristics. Since the human sense of hearing is, in general, highly sensitive to signals containing narrow spectral components, the above bit allocation technique improves not only the measured value of signal-to-noise ratio, but also the signal-to-noise ratio perceived by the listener.

However, if spectrum-dependent bit allocation is performed simply with the purpose of improving the signal-to-noise characteristics, a sufficient number of bits cannot be allocated to bands corresponding to the spectral regions in a signal containing a large number of narrow spectral components, such as the sound of a triangle. With such a signal, it is desirable to improve the sound quality provided by the bit allocation technique just described.

OBJECTS AND SUMMARY OF THE INVENTION

It is an object of the present invention to provide a data compression apparatus that provides a high degree of compression of a digital audio input signal, and that provides a compressed signal that, after expansion, decoding, and reproduction, has an acceptable sound quality as perceived by the listener, even when the signal includes a large number of narrow spectral components.

Accordingly, the present invention provides a data compression apparatus for compressing a digital input signal to provide a compressed digital output signal. The apparatus comprises a circuit that derives plural spectral coefficients from the digital input signal, and groups the spectral coefficients into bands. The apparatus also includes an adaptive bit allocation circuit that adaptively allocates a number of spectrum-dependent quantizing bits among the bands to allocate to each band a number of spectrum-dependent quantizing bits for quantizing each of the spectral coefficients in the band. The number of spectrum-dependent quantizing bits allocated to each band by the adaptive bit allocation circuit is determined according to the band magnitude, weighted depending on the band frequency.

Weighting the allocation of spectrum-dependent bits depending on the band frequency is most effective when it increases the number of spectrum-dependent quantizing bits allocated to lower frequency bands for a given band magnitude. This is because noise at higher frequencies is subjectively less audible, as a result of the frequency characteristics of the human sense of hearing. This is also because noise at higher frequencies tends to be masked by lower-frequency signals. Consequently, the adaptive bit allocation circuit may be so designed that more bits are allocated to lower-frequency bands for the same band magnitude as a way of achieving the above-mentioned weighting of the allocation of spectrum-dependent bits to each band.

The apparatus according to the invention may additionally comprise a fixed-bit allocation circuit that allocates a number of level-dependent quantizing bits among the bands according to a predetermined bit allocation pattern defining, for each band, the number of level-dependent quantizing bits allocated for quantizing each of the spectral coefficients in the band. The apparatus may also include a quantizing circuit that quantizes each of the spectral coefficients in a band using a number of quantizing bits. The number of quantizing bits used is equal to the sum of the number of spectrum-dependent quantizing bits allocated for quantizing each of the spectral coefficients in the band and the number of level-dependent quantizing bits allocated for quantizing each of the spectral coefficients in the band.

Although the ratio between level-dependent bits and spectrum-dependent bits may be fixed, sound quality is further improved by making this ratio variable in response to the input signal. Consequently, the data compression apparatus according to the invention may provide a total number of available quantizing bits for quantizing all the spectral coefficients, and may additionally include a division ratio determining circuit that determines a division of the total number of available quantizing bits between level-dependent quantizing bits and spectrum dependent quantizing bits in response to the smoothness of the spectrum, i.e., the lack of tonality, of the digital input signal.

The sound quality perceived by a listener can be further improved by providing plural weighting patterns and selecting the appropriate one of the weighting patterns in response to the input signal, or by progressively changing weighting variables in response to the input signal. Consequently, the data compression apparatus according to the invention may include a circuit that stores plural frequency-dependent weighting patterns, a circuit that selects, in response to the digital input signal, and that provides to the adaptive bit allocation circuit as a selected frequency-dependent weighting pattern, an appropriate one of the stored frequency-dependent weighting patterns. Alternatively, the adaptive bit allocation device may include a circuit that weights the band magnitude of each band by a weighting coefficient dependent on the digital input signal and the frequency of the band.

In the data compressor according to the present invention, the number of spectrum-dependent quantizing bits allocated to quantize the spectral coefficients in each band is determined by the band magnitude, weighted in dependence on the band frequency, to allocate quantizing bits more efficiently and compatibly with the human sense of hearing. With this technique, improved sound quality is achieved, especially with input signals having plural narrow, isolated spectral components, even at low bit rates.

In a method according to the invention for compressing a digital input signal to provide a compressed digital output signal, plural spectral coefficients are derived from the digital input signal, and are grouped into bands. A number of spectrum-dependent quantizing bits are adaptively allocated among the bands to allocate to each band a number of spectrum-dependent quantizing bits for quantizing each spectral coefficient in the band. The number of spectrum-dependent quantizing bits allocated to each band is determined according to the band magnitude, weighted depending on the band frequency.

A medium according to the invention has stored thereon a compressed digital signal derived from a digital input signal by a data compressing method in which plural spectral coefficients are derived from the digital input signal, and are grouped into bands. A number of spectrum-dependent quantizing bits is allocated among the bands to allocate to each band a number of spectrum-dependent quantizing bits for quantizing each spectral coefficient in the band. The number of spectrum-dependent quantizing bits allocated to each band is determined according to the band magnitude, weighted depending on the band frequency. Each spectral coefficient in each band is quantized using a number of quantizing bits including the number of spectrum-dependent quantizing bits allocated for quantizing each spectral coefficient in the band. The quantized spectral coefficient are included in the compressed digital signal.

A expander according to the invention expands a compressed digital signal derived from a digital input signal by a data compressing method in which plural spectral coefficients are derived from the digital input signal, and are grounded into bands. A number of spectrum-dependent quantizing bits is adaptively allocated among the bands to allocate to each band a number of spectrum-dependent quantizing bits for quantizing each spectral coefficient in the band. The number of spectrum-dependent quantizing bits allocated to each band is determined according to the band magnitude, weighted depending on the band frequency. Each spectral coefficient in each band is quantized using a number of quantizing bits including the number of spectrum-dependent quantizing bits allocated for quantizing each spectral coefficient in the band. The quantized spectral coefficients and data indicating the number of quantizing bits for each band are included in the compressed digital signal. The expander includes a circuit that separates from the compressed digital signal, for each band, the quantized spectral coefficients and the data indicating the number of quantizing bits. The expander also includes a circuit that dequantizes, for each band, the quantized spectral coefficients in response to the data indicating the number of quantizing bits. Finally, the expander includes a circuit that derives the output signal from the dequantized spectral coefficients.

DETAILED DESCRIPTION OF THE INVENTION

Figure 1:
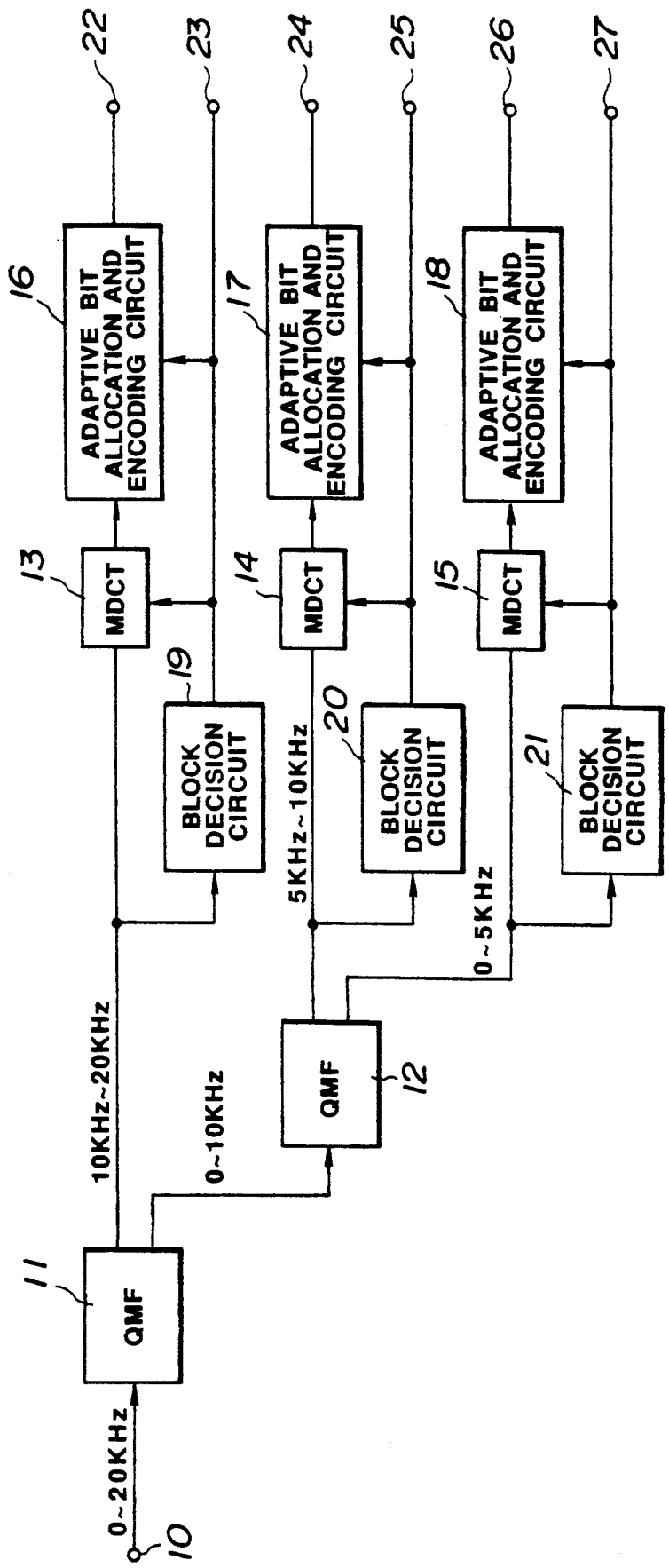
FIG. 1 is a block circuit diagram showing a typical construction of a data compression apparatus embodying the present invention.

Referring to the drawings, an illustrative embodiment of the present invention will be described in detail.

The data compression apparatus shown in FIG. 1 is adapted for compressing a digital audio input signal supplied to the input terminal 10 by adaptive bit allocation. The apparatus includes the adaptive bit allocation and quantizing circuits 16 through 18, by means of which the total number of quantizing bits available for allocation among the bands is divided between level-dependent bits allocated according to one of plural predetermined bit allocation patterns selected according to the level of the input signal, and spectrum-dependent bits allocated according to the spectral distribution of the input signal. For each block into which the input signal is divided in time, a number of level-dependent bits is allocated to each band into which the input signal is divided in frequency according to one of plural predetermined bit allocation patterns selected according to the input signal level. In addition, a number of spectrum-dependent bits is allocated to each band depending on the band magnitude of each band. Spectrum-dependent bits are allocated using weighting depending on the frequency of each band. The spectral coefficients in each band are then quantized with a number of quantizing bits equal to the sum of the level-dependent quantizing bits for the band and the spectrum-dependent quantizing bits for the band.

Noise at higher frequencies is less perceptible to the human sense of hearing than noise at lower frequencies. This is because of the frequency response characteristics of the human sense of hearing, and also because lower-frequency signals tend to mask higher-frequency signals (or noise). Accordingly, it is more effective to weight the allocation of spectrum-dependent quantizing bits so that, for a given signal level, the number of spectrum-dependent bits are allocated to lower-frequency bands is increased compared with the number of spectrum-dependent bits allocated to the lower-frequency bands when weighting is not employed. Since the number of available quantizing bits is fixed, increasing the number of spectrum-dependent bits allocated to lower-frequency bands decreases the number of spectrum-dependent bits allocated to higher-frequency bands. Consequently, the adaptive bit allocation and quantizing circuits 16 through 18 are designed so that the spectrum-dependent bit allocation is weighted according to the frequency of the band, such that, for a given signal level, more spectrum-dependent bits are allocated to the lower-frequency bands than are allocated to the higher-frequency bands.

According to the present invention, the ratio between the number of level-dependent bits and the number of spectrum-dependent bits may be fixed, or may depend on the input signal. The sound quality is improved if the ratio is made to depend on the input signal. Consequently, bit allocation is carried out by the adaptive bit allocation and quantizing circuits 16 through 18 with an input signal-dependent ratio between the number of level-dependent bits and the number of spectrum-dependent bits.

By providing plural weighting patterns, and selecting the an appropriate one of the weighting patterns according to the input signal, or by gradually changing the weighting factors according to the input signal, spectrum-dependent bits may be allocated in a way that is more compatible with the characteristics of the human sense of hearing. This further improves the sound quality perceived by the listener. Consequently, the adaptive bit allocation and quantizing circuits 16 through 18 may carry out spectrum-dependent bit allocation, which, for each block of the input signal, depends on the weighted band magnitude in each band, which, in turn, depends on weighting dependent on the frequency of each band, using weighting coefficients that can change according to the input signal.

An embodiment of a data compression apparatus in which a digital audio input signal, such as a PCM audio signal, is compressed using the techniques of sub-band coding, adaptive transform coding, and adaptive bit allocation will now be described with reference to FIG. 1. The circuit shown in FIG. 1 may be constructed using digital logic chips, or may be realized using a suitably-programmed microprocessor and associated memory. The circuit may also be constructed using a suitably-programmed digital signal processor chip and associated memory.

In the data compression apparatus shown in FIG. 1, a digital audio input signal is divided in frequency by a filter into plural frequency range signals, each in a frequency range. Each frequency range signal is divided in the time domain into blocks, and each block of each frequency range signal is orthogonally transformed to provide plural spectral coefficients. The resulting spectral coefficients in the frequency domain are grouped into bands, and the spectral coefficients in each band are quantized by adaptive bit allocation in which quantizing bits are allocated for quantizing the spectral coefficients in each band.

Alternatively, the spectral coefficients may be generated by using suitable filters to divide the input signal in frequency into plural narrow frequency bands without dividing the inputs signal in time.

The spectral coefficients are grouped into bands having a bandwidth that increases with increasing frequency. Such bands take the frequency discrimination characteristics of the human sense of hearing into account. Preferably, at least the low- and middle-frequency spectral coefficients are grouped into critical bands. The term "critical band" means a frequency band produced by a frequency division system that takes the frequency discrimination characteristics of the human sense of hearing into account. A critical band is a band of noise that can be masked by a pure sound having the same intensity as the band of noise, and a frequency in the middle of the band of noise. The width of the critical bands increases with increasing frequency. The audio frequency range of 0 Hz to 20 kHz is normally divided into 25 critical bands. The higher-frequency spectral coefficients may be grouped into bands that are a sub-multiple of a critical band. In the following description, the word "band," used alone, will mean a group of spectral coefficients. At least at low and middle frequencies, a "band" is a critical band. At high frequencies, a "band" may be a sub-multiple of a critical band.

In the embodiment shown, the block size or block length into which the input signal is divided in time before the orthogonal transform is adaptively changed in response to the dynamic characteristics of the input signal. Block floating may be applied to each block of each frequency range signal before the block is orthogonally transformed. Additionally, block floating is applied to the spectral coefficients in each band.

Referring to FIG. 1, a PCM digital audio input signal in the frequency range of 0 Hz to 20 kHz, for example, is supplied to the input terminal 10. The input signal is divided by the band-dividing filter 11, which is preferably a Quadrature Mirror (QMF) filter, into a frequency range signal in the frequency range of 0 Hz to 10 kHz and a high frequency range signal in the frequency range of 10 to 20 kHz. The frequency range signal in the frequency range of 0 Hz to 10 kHz is further divided by the band-dividing filter 12, which is also preferably a QMF filter, into a low frequency range signal in the frequency range of 0 Hz to 5 kHz and a middle frequency range signal in the frequency range of 5 to 10 kHz.

The 10 kHz to 20 kHz frequency range signal from the band-dividing filter 11 is fed into the orthogonal transform circuit, 13, which is preferably a modified discrete cosine transform (MDCT) circuit, and the block size decision circuit 19. The 5 kHz to 10 kHz frequency range signal from the band-dividing filter 12 is fed into the MDCT circuit 14, and the block size decision circuit 12. The 0 Hz to 5 kHz frequency range signal from the band-dividing filter 12 is fed into the MDCT circuit 14, and the block size decision circuit 21. The block size that is subject to MDCT processing is decided in each of the block size decision circuits 19, 20 and 21. The frequency range signals from the band-dividing filters 11 and 12 are MDCT processed by the MDCT circuits 13, 14 and 15 using block sizes indicated by block size data supplied from the block size decision circuits 19, 20 and 21.

Figure 2:
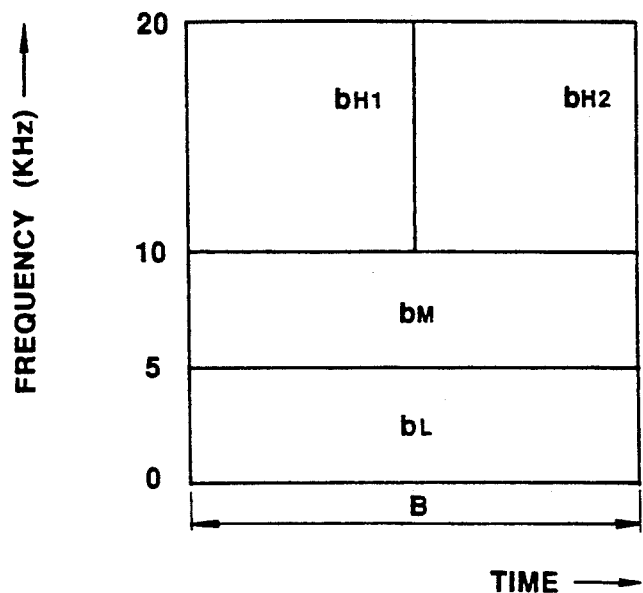
FIG. 2 is a diagrammatic view for explaining the frequency and time division of the input signal in the data compression apparatus shown in FIG. 1.

FIG. 2 shows a practical example of block sizes used by the MDCT circuits 13, 14 and 15. In this, the frequency ranges are made wider and the time resolution is increased (i.e., the block length is made shorter) in the direction of increasing frequency. In the same time as one MDCT operation carried out on the blocks $b_L$, $b_M$ of the low-frequency range signal (0 Hz to 5 kHz) and the middle frequency range signal (5 to 10 kHz), respectively, two MDCT operations are carried out on the blocks $b_{H1}$, $b_{H2}$ of the high frequency range signal (10 to 20 kHz).

The arrangement just described enables the construction of the apparatus to be simplified by having the same number of spectral coefficients in each frequency range, while providing a frequency resolution that is greater in the low- and middle-frequency ranges, where frequency resolution is critical, and a time resolution that is greater in the high-frequency range, because transient signals include more high frequency components. Additionally, the time resolution in all the frequency ranges may be adaptively increased when the input signal undergoes significant temporal changes by further dividing the block lengths by a factor of 2 or 4.

Returning to FIG. 1, spectral coefficients in the frequency domain, which are preferably produced by MDCT processing by the MDCT circuits 13 through 15, are grouped into bands before being fed into the adaptive bit allocation and quantizing circuits 16 through 18. The lower and middle frequency spectral coefficients are grouped into critical bands; the higher frequency spectral coefficients may be grouped into critical bands, or into sub-bands obtained by dividing the higher frequency critical bands in frequency.

In the adaptive bit allocation and quantizing circuits 16 through 18, all the spectral coefficients in each band are quantized with same number of quantizing bits. The adaptive bit allocation and quantizing circuits 16 through 18 allocate the number of quantizing bits that is used for quantizing the spectral coefficients in each band. The construction of the adaptive bit allocation and quantizing circuits 16, 17, and 18 will be described below.

The quantized spectral coefficients are fed from the adaptive bit allocation and quantizing circuits 16 through 18 to the output terminals 22, 24, and 26. Block floating coefficients, indicating the normalization of the spectral coefficients in each band, and word length data, indicating the number of quantizing bits that have been used to quantize the spectral coefficients in each band, are fed to the output terminals together with the quantized spectral coefficients.

A practical example of the construction of the adaptive bit allocation and quantizing circuit will next be described with reference to FIG. 3. This circuit may be constructed using digital logic chips, or may be realized using a suitably-programmed microprocessor and associated memory. The circuit may also be constructed using a suitably programmed digital signal processor chip. The circuit may be realized using the same digital signal processing chip or microprocessor as that used to realize the circuit shown in FIG. 1.

Figure 3:
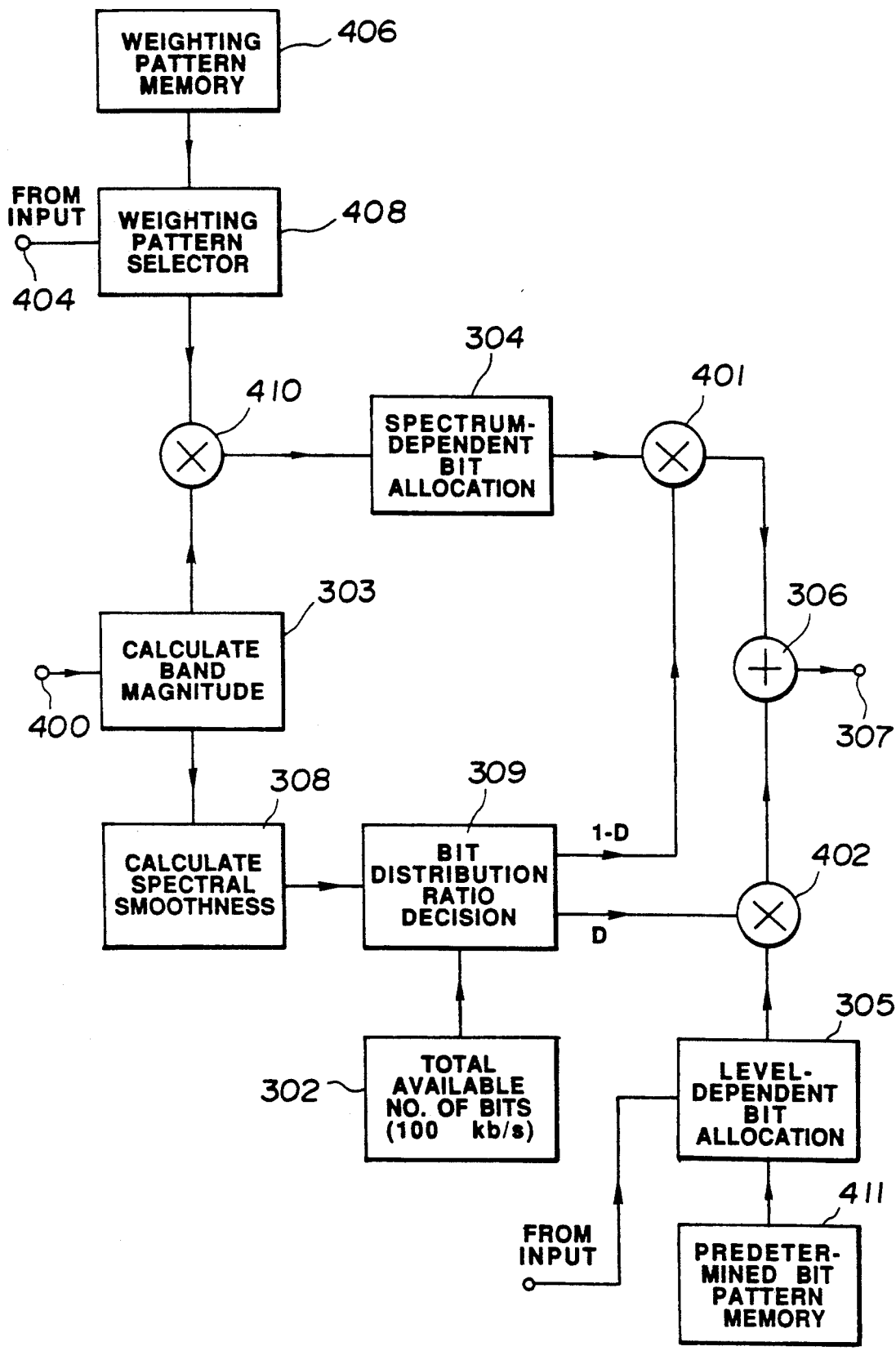
FIG. 3 is a block circuit diagram showing the construction of the adaptive bit allocation and quantizing circuit of the data compression apparatus shown in FIG. 1.

The outputs of the MDCT circuits 13, 14 and 15 shown in FIG. 1 are fed via the input terminal 400 of the adaptive bit allocation and quantizing circuit 300 shown in FIG. 3 to the band magnitude calculating circuit 303. The band magnitude calculating circuit 303 calculates the band magnitude for each band preferably by calculating the energy in each band by taking the square root of the sum of the squares of the signal amplitudes in the band. The band magnitude for each band may alternatively be calculated from the peak or mean values of the signal amplitudes, or by integrating the signal amplitudes.

Figure 4:
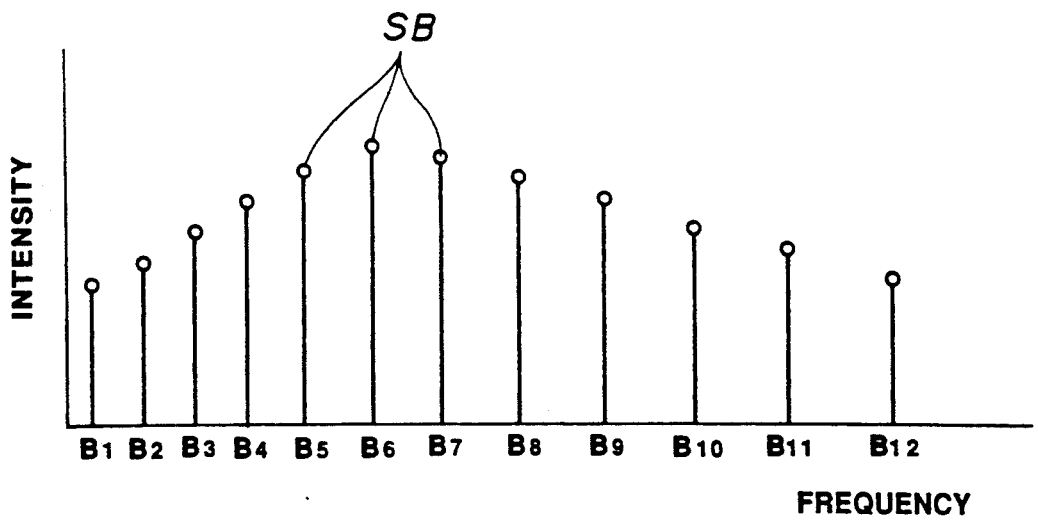
FIG. 4 is shown showing a Bark spectrum in which frequency on a logarithmic scale is plotted on the x-axis, and level, in decibels, is plotted on the y-axis.

The spectrum of the output from the band magnitude calculating circuit 303 for each band represents a spectrum known as a Bark spectrum, as shown, for example, in FIG. 4. In this Figure, only twelve bands, B1 to B12, are shown to simplify the drawing.

The circuit shown in FIG. 3 allocates, to each band, level-dependent quantizing bits according to one of plural bit allocation patterns selected according to the level of the input signal, and spectrum-dependent quantizing bits allocated according the band magnitude, weighted depending on the frequency of the band.

If, for example, the number of bits available for quantizing the all the spectral coefficients, and which may be used for transmission or recording, is 100 kilobits per second (kb/s), the present embodiment allocates the level-dependent quantizing bits according to a selected one of a number of bit allocation patterns, each of which employs a number of bits corresponding to the bit-rate of 100 kb/s. The actual number of level-dependent bits allocated for quantizing the spectral coefficients in each band is adjusted according to the bit distribution ratio by the multiplier 402, which will be described in detail below. The total available number of bits, e.g., bits corresponding to a bit rate of 100 kb/s, is indicated by the total available number of bits indicating circuit 302. The total available number of bits may also be externally programmable.

In the arrangement shown in FIG. 3, the predetermined bit allocation pattern memory 411 has stored therein plural predetermined bit allocation patterns corresponding to a bit rate of 100 kb/s. The level-dependent bit allocation circuit 305 selects an appropriate one of the plural predetermined bit allocation patterns in response to the input signal.

The predetermined bit allocation pattern memory 411 has stored therein a variety of predetermined bit allocation patterns, each of which defines a different allocation among the bands of a number of bits corresponding to a bit rate of 100 kb/s. The different predetermined bit allocation patterns have different bit allocations between the middle- to low-frequency bands on one hand, and the high-frequency bands on the other hand. The level-dependent bit allocation circuit 305 selects, for each block of the input signal, the most appropriate one of the predetermined bit allocation patterns stored in the predetermined bit allocation pattern memory 411.

The level-dependent bit allocation circuit 305 selects the appropriate one of the plural predetermined bit allocation patterns in response to the level of the input signal, such that a predetermined bit allocation pattern in which fewer bits are allocated to higher-frequency bands is selected for lower input signal levels. Selecting the predetermined bit allocation pattern in this way takes advantage of the loudness effect, in which the sensitivity of the human sense of hearing at higher frequencies is reduced at lower signal levels.

The level-dependent bit allocation circuit 305 preferably selects the appropriate predetermined bit allocation pattern in response to the level of the input signal. The level-dependent bit allocation circuit may also select the appropriate predetermined bit allocation pattern in response to the signal levels of all the bands, in response to the level of the output of a frequency dividing circuit which divides the input signal into frequency components by means of a filter, in response to the level of one or more of the spectral coefficients provided by one or more of the MDCT circuits 14 through 16 (FIG. 1), or in response to the level of one or more of the frequency range signals provided by the QMF filters 11 and 12.

Figure 5A:
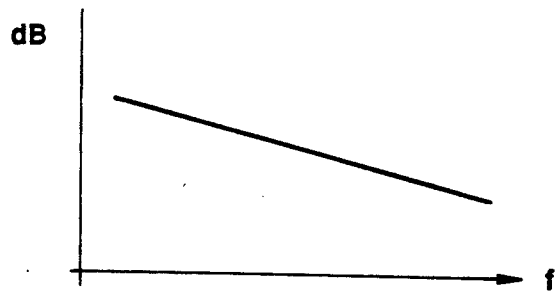
FIGS. 5A through 5D are frequency response curves showing four different weighting patterns. In these curves, frequency on a logarithmic scale is plotted on the x-axis, and relative level, in decibels, is plotted on the y-axis.
Figure 5B:
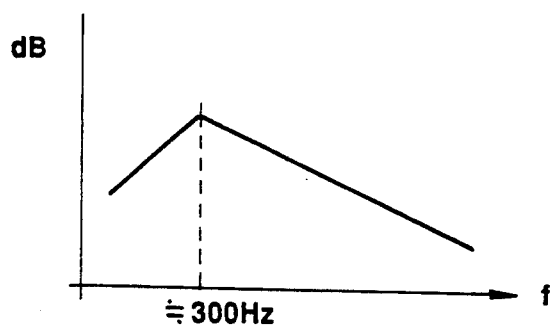
Figure 5C:
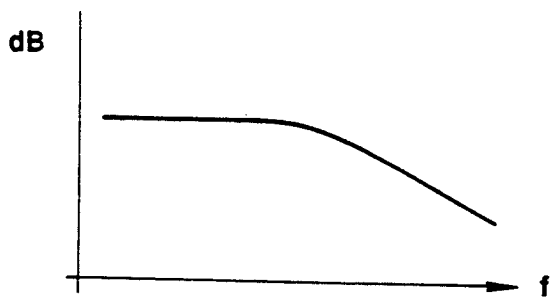
Figure 5D:
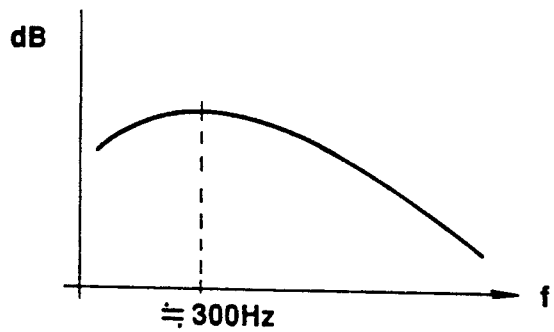

The spectrum-dependent bit allocation is carried out by the spectrum-dependent bit allocation circuit 304, in response to the weighted output of the band magnitude calculating circuit 303. The multiplier 410 receives a weighting pattern of a frequency-dependent weighting coefficient for each band and the output of the band magnitude calculating circuit 303. The multiplier multiplies the magnitude of each band from the band magnitude calculating circuit 303 by the weighting coefficient for the band, defined by the weighting pattern, to provide a weighted band magnitude for each band. The weighted band magnitude for each band is fed to the spectrum-dependent bit allocation circuit 304. The preferred embodiment uses the weighting pattern shown in FIG. 5A.

For each block of the input signal, the spectrum-dependent bit allocation circuit 304 allocates spectrum-dependent quantizing bits to the spectral coefficients in each band such that the spectrum-dependent bits are allocated in response to the weighted band magnitude of each band. In the embodiment shown, the spectrum-dependent bit allocation circuit allocates a number of spectrum-dependent quantizing bits equal to the total available number of quantizing bits, e.g., a number of spectrum-dependent bits corresponding to a bit rate of 100 kb/s. The actual number of spectrum-dependent bits finally allocated for quantizing the spectral coefficients is adjusted according to the bit distribution ratio by the multiplier 401, which will be described in detail below.

The spectrum-dependent bit allocation circuit 304 allocates quantizing bits among the bands according to the formula:

$$b(k)=\delta+\tfrac{1}{2}\log_2[\sigma'^2(k)/P]$$

where b(k) is the number of spectrum-dependent quantizing bits allocated to quantize each of the spectral coefficients in the k'th band, $\delta$ is an optimum bias, $\sigma'^2(k)$ is the weighted band magnitude of the k'th band, and P is the mean quantization noise power over all the entire frequency spectrum. To find the optimum value of b(k) for each band, the value of δ is changed so that the sum of the b(k)s for all the bands is equal to, or just less than, the total number of spectrum-dependent quantizing bits.

As a preferred alternative to multiplying the band magnitudes from the band magnitude calculating circuit 303 by single weighting pattern of frequency-dependent weighting coefficients, the band magnitudes are multiplied by the weighting coefficients of a selected one of plural weighting patterns. Plural weighting patterns of frequency-dependent weighting coefficients are stored in the weighting pattern memory 406, and one of the plural weighting patterns is selected in response to the input signal.

The input signal is fed via the input terminal 404 into the weighting pattern selector 408. The weighting pattern selector 408 selects one of the weighting patterns from the weighting pattern memory 406, and feeds the selected weighting pattern into the multiplier 410. The multiplier also receives the band magnitudes from the band magnitude calculating circuit 303, and multiplies the band magnitude of each band by the weighting coefficient for the band defined by the selected weighting pattern. The resulting weighted band magnitude for each band is fed to the spectrum-dependent bit allocation circuit 304.

Some basic weighting patterns are shown in FIGS. 5A through 5D. In addition, variations on these basic weighting patterns shown may also be stored in the weighting pattern memory 406. In the variations, the basic patterns are altered in terms of slope and turn-over frequency or frequencies to provide optimum weighting patterns for a wide range of input signal conditions.

The weighting pattern selector 408 selects the appropriate one of the available weighting patterns from the weighting pattern memory 406 according to the level of the input signal. The weighting pattern selector may additionally or alternatively take the spectral content of the input signal into account when selecting the appropriate one of the available weighting patterns.

As a further alternative, the weighting pattern selector 408 may calculate, in response to the input signal, a weighting pattern by interpolating between, e.g., two stored weighting patterns. As a further alternative, the weighting pattern selector could adjust, in response to the input signal, the weighting coefficients of a selected weighting pattern. In the ways just described, the present embodiment changes the weighting coefficients to provide a bit allocation that is more compatible with the human sense of hearing. This improves the sound quality perceived by the listener.

The division of the total available number of bits between level-dependent bits allocated according to a selected one of plural predetermined bit allocation patterns and spectrum-dependent bits allocated according to the spectrum of the input signal is determined in response to an index that indicates the smoothness of the spectrum of the input signal. The smoothness of the spectrum of the input signal is a measure of the lack of tonality of the input signal. The output of the band magnitude calculating circuit 303 is fed into to the spectral smoothness calculating circuit 308. Alternatively, the spectral smoothness calculating circuit may receive the spectral coefficients via the input terminal 400. The spectral smoothness circuit calculates the quotient of the sum of absolute values of the differences between the values of adjacent band magnitudes by the sum of all the band magnitudes, i.e., $$I = 0.5 \times \frac{\sum_{i=1}^{n} |S_i - S_{i-1}|}{\sum_{i=1}^{n} |S_i|}$$

where I is the spectral smoothness index, and $S_i$ is the band magnitude in the i'th band. A spectral smoothness index may alternatively be calculated using the spectral coefficients received via the input terminal 400.

The calculated spectral smoothness index I is supplied to the division ratio decision circuit 309. The division ratio decision circuit determines the division ratio D that is applied to the total available number of bits. The division ratio D is the ratio between the number of level-dependent bits and the total available number of bits. The division ratio decision circuit also calculates the complement of the division ratio, (1−D), which is the ratio between the number of spectrum-dependent bits and the total available number of bits.

The division ratio decision circuit 309 feeds the division ratio D to the multiplier 402, which is also supplied with the output of the level-dependent bit allocation circuit 305. The multiplier 402 calculates the actual number of level-dependent bits that are to be allocated to each band, taking into account the division ratio D. The division ratio decision circuit 309 also feeds the complement of the division ratio, 1−D, to the multiplier 401, which is also supplied with the output of the spectrum-dependent bit allocation circuit 304. The multiplier 401 calculates the actual number of spectrum-dependent bits that are to be allocated to each band, taking into account the division ratio D.

In an alternative arrangement, the multipliers 401 and 402 can be dispensed with, and the division ratio D can be fed into the level-dependent bit allocation circuit 305, which would then select a predetermined bit allocation pattern using the number of bits indicated by multiplying the total available number of bits, e.g., bits corresponding to a bit rate of 100 kb/s, by the division ratio. The complement of the division ratio, 1−D, would be fed to the spectrum-dependent bit allocation circuit 304, which would allocate among the bands according to the weighted band magnitude of each band a number of bits calculated by multiplying the total available number of bits, e.g., bits corresponding to a bit rate of 100 kb/s, by the complement of the division ratio.

The outputs of the multipliers 401 and 402 are fed into the adder 306. The adder 306 determines the total number of quantizing bits allocated for quantizing each spectral coefficient in each band by summing, for each block of the input signal, for each band, the value of the level-dependent bit allocation and the value of the spectrum-dependent bit allocation. The output of the adder 306 is supplied to the output terminal 307. The spectral coefficients in each band are then quantized using the number of quantizing bits indicated by data taken from the output terminal 307. For each block of the input signal, a set of numbers is provided at the output terminal 307 indicating the total number of bits allocated to quantize the spectral coefficients in each band.

The division of the total available number of bits between level-dependent bits and spectrum-dependent bits may alternatively be determined as follows: for each band, the value of the weighted band magnitude expressed in decibels is multiplied by the spectral smoothness index R, which can have a value between 0 and 1. The resulting products are summed to find a first sum S1. The number of level-dependent bits allocated to each band is then multiplied by (1−R), and the resulting products are summed to find a second sum S2. The first and second sums, S1 and S2, are each divided by the sum of the first and second sums (S1−S2) to provide first and second ratios. The first and second ratios are then used as the bit division ratios between the spectrum-dependent bit allocation and the level-dependent bit allocation, respectively, and the total available number of bits.

Figure 6:
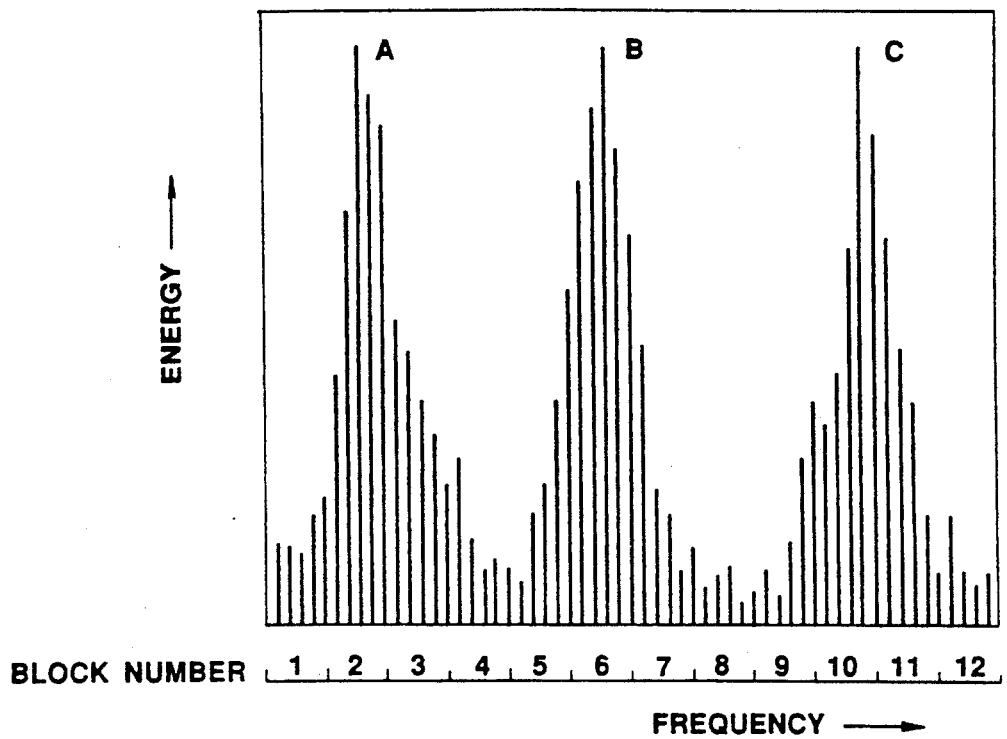
FIG. 6 is a graph showing the spectrum of an input signal including narrow spectral components in which frequency on a logarithmic scale is plotted on the x-axis, and level, in decibels, is plotted on the y-axis.
Figure 7:
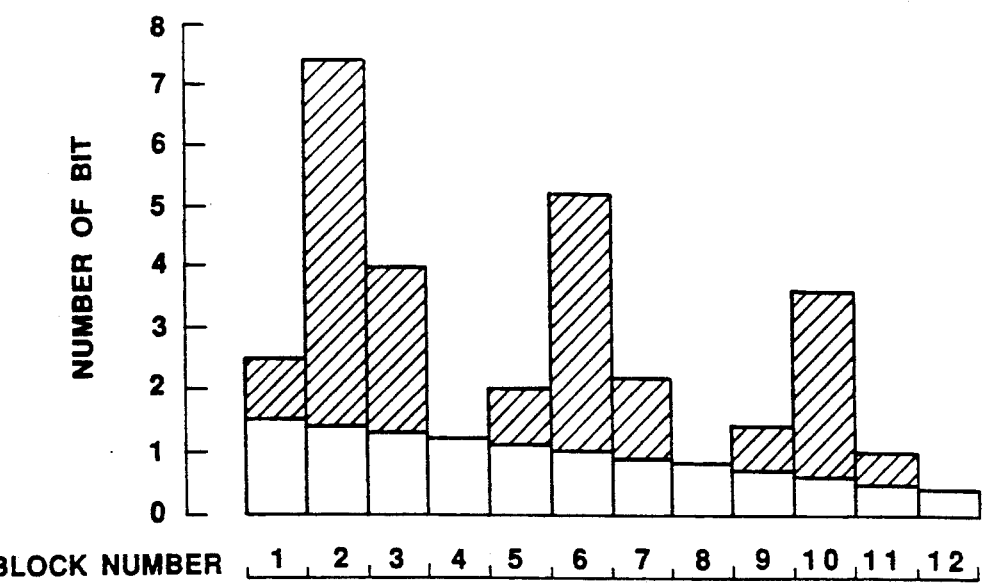
FIG. 7 is a graph for explaining bit allocation to the input signal shown in FIG. 6 by the data compression apparatus shown in FIG. 1. In this, frequency on a logarithmic scale is plotted on the x-axis, and the number of bits is plotted on the y-axis.

FIG. 7 shows an example of how bits are allocated to an input signal having the spectrum shown in FIG. 6. To simplify the drawings, only twelve bands are shown. In FIG. 7, the shaded rectangles indicate the number of spectrum-dependent bits allocated to each band, and the unshaded rectangles show the number of level-dependent bits allocated to each band. A number of bits equal to the sum of the two numbers of bits is allocated for quantizing each of the spectral coefficients in each band. Although the numbers of bits are shown in FIG. 7 as having real values, instead of as integers, the real numbers are ultimately converted into corresponding integers by, e.g., rounding, to find, for each band, the total number of bits to be allocated for quantizing each spectral coefficient in the band.

The input signal shown in FIG. 6 includes the narrow spectral components A, B and C having a substantially equal level to one another. In a conventional data compressor, spectrum-dependent bits would be allocated in such a way as to optimize the signal-to-noise ratio in response to the levels of signal components in each band. To the quantizing bits allocated to each of bands 2, 6 and 10 in accordance with a predetermined bit allocation pattern selected according to the level of the input signal would be added to each of the bands substantially the same number of spectrum-dependent bits. The data compressor according to the present invention allocates fewer spectrum-dependent quantizing bits to bands of a given level as the frequency increases. Thus, fewer spectrum-dependent quantizing bits are allocated to band 10 than to band 6, and fewer quantizing bits are allocated to band 6 than to band 2.

Compared with a conventional data compressor, the data compressor according to the present invention has a signal-to-noise characteristic that is improved at lower frequencies, and that is degraded at higher frequencies. Because of the frequency characteristic of the sensitivity of the human sense of hearing, noise at higher frequencies, which is increased in the data compressor according to the present invention, is less audible than noise at lower frequencies. Moreover, the noise at higher frequencies is masked by lower frequency signals. Thus, the increase in noise at higher frequencies in the data compressor according to the present invention is not perceived by the human sense of hearing. On the other hand, noise at lower frequencies, to which the human sense of hearing is more sensitive, is reduced in the data compressor according to the present invention. The overall effect of this is an improvement in the sound quality perceived by the listener.

Fewer spectrum-dependent bits are allocated to, e.g., the middle-frequency band number 6 of FIGS. 6 and 7 than to the lower-frequency band number 2. Such a bit allocation cannot be achieved simply by permanently allocating more bits to lower-frequency bands in the selected level-dependent bit allocation pattern. This effect may only be achieved by allocating, for each block of the input signal, spectrum-dependent bits in response to the band magnitude in each band, weighted according to the frequency of the band.

In the embodiment illustrated, it is assumed that the MDCT produces relatively few spectral coefficients below about 100 Hz. However, since signals corresponding to higher frequencies are effectively present in each lower frequency spectral coefficient, a sufficiently large number of bits needs to be allocated for quantizing the lower frequencies. Thus, as an approximation, it suffices if bits are allocated depending on the levels of the signal components of the respective bands so that more bits are allocated to the lower frequencies.

A data compression apparatus in which a relatively long block of the input signal is orthogonally transformed to provide the spectral coefficients provides a sufficient density of spectral coefficients in the frequency range below 100 Hz that the spectrum-dependent bit allocation to spectral coefficients in bands below 50 Hz can be reduced compared with the bit allocation to bands above this frequency. This bit reduction may be made because of the reduced sensitively of the human sense of hearing at very low frequencies.

Figure 8:
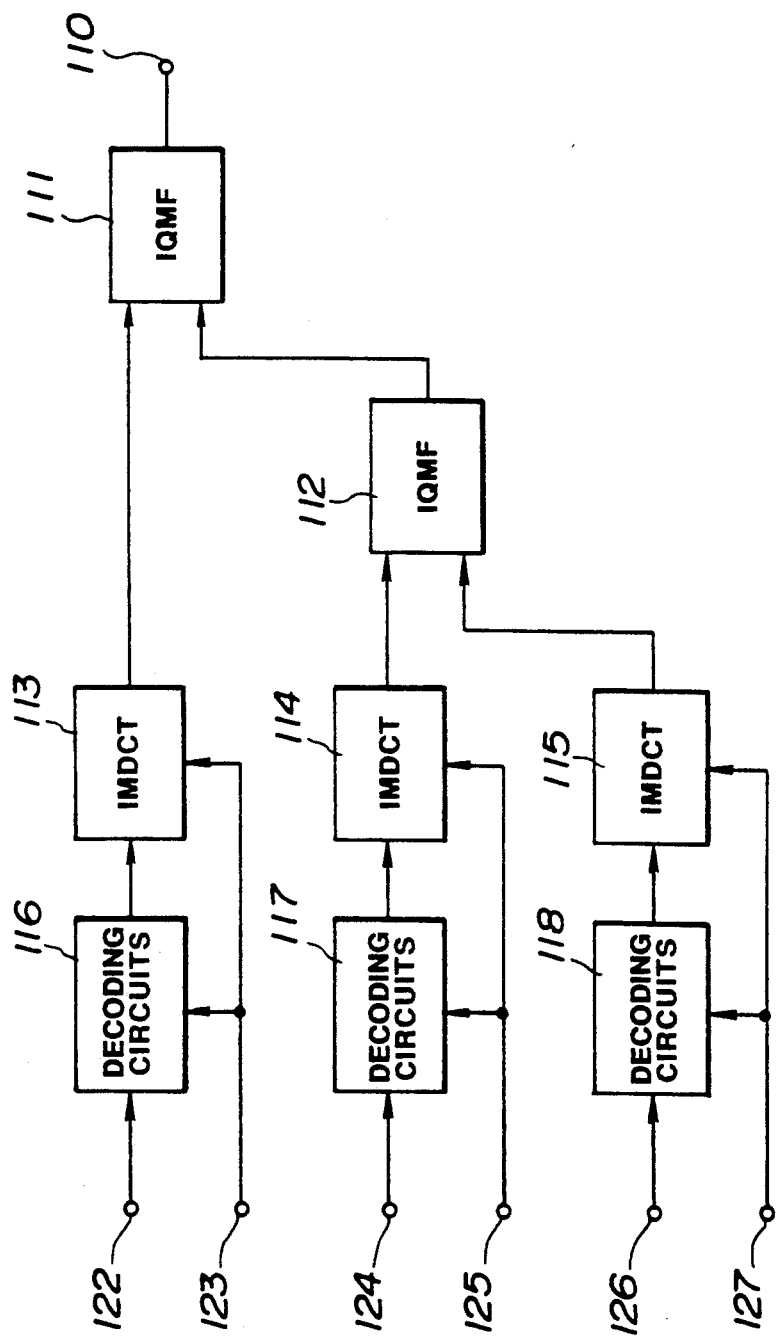
FIG. 8 is a block circuit diagram showing the typical construction of a complementary data expander embodying the present invention.

FIG. 8 shows a block diagram of a complementary expander for expanding signals compressed by the data compression apparatus described above. In the expander, the quantized spectral coefficients for each band are supplied to the input terminals 122, 124, and 126 of the expander. Block floating information, block size information, and data indicating the number of bits used to quantize the spectral coefficients in each band is supplied to the input terminals 123, 125, and 127. The signals supplied to the input terminals are fed into the dequantizing circuits 116, 117, and 118, where the adaptive bit allocation is reversed using the above-mentioned data on the number of quantizing bits, which, for each block of the original input signal, indicates how many bits have been used to quantize the spectral coefficients in each band.

The outputs of the dequantizing circuits 116, 117, and 118 are supplied to inverse modified discrete cosine transform (IMDCT) circuits 113, 114, and 115, which are also supplied with the block size information via the input terminals 123, 125, and 127. In the IMDCT circuits, the dequantized spectral coefficients in the frequency domain are orthogonally transformed into a block of samples of three frequency range signals in the time domain. The frequency range signals in the time domain from the IMDCT circuits 113, 114, and 115, are combined using the inverse quadrature mirror filter (IQMF) circuits 112 and 111, into a full frequency range PCM digital audio signal, which is fed to the output terminal 110.

It should be noted that, since the expander circuit shown in FIG. 8 is provided with data indicating the number of quantizing bits from the compressor circuit, the expander can expand a signal compressed by a known data compressor, and will give improved sound quality when expanding a signal compressed by a data compressor according to the invention. The expander circuit shown in FIG. 8 can expand the compressed data provided by the data compression apparatus to produce a high quality decoded signal using a relatively small amount of circuitry.

It will be seen from above that the present invention provides a data compression apparatus in which the total bits available for bit allocation are distributed between level-dependent bits and spectrum-dependent bits. The spectrum-dependent bits are allocated in response to the band magnitude, weighted depending on the frequency of the band. This provides a bit allocation that is optimum when the compressed signal is expanded, decoded, reproduced, and perceived by the human sense of hearing. The optimum bit allocation is provided without the need to carry out complicated calculations of masking, and is provided for signals having a flat spectral distribution, for signals having a single spectral line, and for signals having a large number of narrow spectral lines. The result is that a data compression apparatus may be achieved which has a high sound quality despite the small size and a low bit rate.

We claim:

1. An apparatus for compressing a digital input signal to provide a compressed digital output signal, the apparatus comprising:
 a means for deriving plural spectral coefficients from the digital input signal, and for grouping the spectral coefficients into bands, each band having a band magnitude and a band frequency; and
 an adaptive bit allocation means for adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to the band magnitude, weighted depending on the band frequency.

2. The apparatus of claim 1, wherein the adaptive bit allocation means allocates to each band a number of spectrum-dependent quantizing bits determined according to the band magnitude, the band magnitude being weighted depending on the band frequency such that the number of spectrum-dependent quantizing bits allocated to lower frequency bands for a given band magnitude is increased.

3. The apparatus of claim 1, wherein:
 the apparatus additionally comprises:
  a means for determining, for each band, the band magnitude in response to the spectral coefficients in the band, and
  a weighting means for weighting, for each band, the band magnitude depending on the band frequency to provide a weighted band magnitude; and
 the adaptive bit allocation means allocates to each band the number of spectrum-dependent quantizing bits for quantizing each spectral coefficient in the band in response to the weighted band magnitude for the band.

4. The apparatus of claim 1, wherein the adaptive bit allocation means allocates to each band a number of spectrum-dependent quantizing bits determined according to the band magnitude weighted by a weighting coefficient dependent on the digital input signal and the band frequency.

5. The apparatus of claim 1, wherein:
 the adaptive bit allocation means allocates to each band a number of spectrum-dependent quantizing bits determined according to the band magnitude weighted depending on the band frequency according to a selected frequency-dependent weighting pattern; and the apparatus additionally comprises:
  a means for storing plural frequency-dependent weighting patterns, and
  a selecting means for selecting, in response to the digital input signal, and for providing to the adaptive bit allocation means as the selected frequency-dependent weighting pattern, an appropriate one of the plural frequency-dependent weighting patterns.

6. The apparatus of claim 5, wherein:
 the digital input signal has a level; and
 the selecting means is for selecting the appropriate one of the plural frequency-dependent weighting patterns in response to the level of the digital input signal.

7. The apparatus of claim 5, wherein:
 the digital input signal has a spectrum; and
 the selecting means is for selecting the appropriate one of the plural frequency-dependent weighting patterns in response to the spectrum of the digital input signal.

8. The apparatus of claim 5, wherein the adaptive bit allocation means allocates to each band a number of spectrum-dependent quantizing bits determined according to the band magnitude, the band magnitude being weighted depending on the band frequency according to the selected frequency-dependent weighting pattern such that the number of spectrum-dependent quantizing bits allocated to lower frequency bands for a given band magnitude is increased.

9. The apparatus of claim 1, additionally comprising:
 a level-dependent bit allocation means for allocating a number of level-dependent quantizing bits among the bands according to a predetermined bit allocation pattern defining, for each band, a number of level-dependent quantizing bits allocated for quantizing each spectral coefficient in the band; and
 a quantizing means for quantizing each spectral coefficient in a band using a number of quantizing bits equal to the sum of the number of spectrum-dependent quantizing bits allocated for quantizing each spectral coefficient in the band and the number of level-dependent quantizing bits allocated for quantizing each spectral coefficient in the band.

10. The apparatus of claim 9, wherein the adaptive bit allocation means allocates to each band a number of spectrum-dependent quantizing bits determined according to the band magnitude, the band magnitude being weighted depending on the band frequency such that the number of spectrum-dependent quantizing bits allocated to lower frequency bands for a given band magnitude is increased.

11. The apparatus of claim 9, wherein:
 the apparatus additionally comprises:
  a means for determining, for each band, the band magnitude in response to the spectral coefficients in the band, and
  a weighting means for weighting, for each band, the band magnitude depending on the band frequency to provide a weighted band magnitude; and
 the adaptive bit allocation means allocates to each band the number of spectrum-dependent quantizing bits for quantizing each spectral coefficient in the band in response to the weighted band magnitude.

12. The apparatus of claim 9, wherein the adaptive bit allocation means allocates to each band a number of spectrum-dependent quantizing bits determined according to the band magnitude weighted by a weighting coefficient dependent on the digital input signal and the band frequency.

13. The apparatus of claim 9, wherein:
the adaptive bit allocation means allocates to each band a number of spectrum-dependent quantizing bits determined according to the band magnitude weighted depending on the band frequency according to a selected frequency-dependent weighting pattern; and
the apparatus additionally comprises:
a means for storing plural frequency-dependent weighting patterns, and
a selecting means for selecting, in response to the digital input signal, and for providing to the adaptive bit allocation means as the selected frequency-dependent weighting pattern, an appropriate one of the plural frequency-dependent weighting patterns.

14. The apparatus of claim 13, wherein the adaptive bit allocation means allocates to each band a number of spectrum-dependent quantizing bits determined according to the band magnitude weighted depending on the band frequency such that the number of spectrum-dependent quantizing bits allocated to lower frequency bands for a given band magnitude is increased.

15. The apparatus of claim 9, wherein:
the level-dependent bit allocation means is for allocating level-dependent quantizing bits among the bands according to a selected bit allocation pattern; and
the apparatus additionally comprises:
a means for storing plural predetermined bit allocation patterns, and
an additional selecting means for selecting, in response to the digital input signal, and for providing to the level-dependent bit allocating means as the selected bit allocation pattern, an appropriate one of the plural predetermined bit allocation patterns.

16. The apparatus of claim 9, wherein:
a total number of available quantizing bits is available for quantizing all the spectral coefficients;
the digital input signal has a spectrum, and the spectrum has a smoothness;
the apparatus additionally comprises:
a division ratio determining means for determining a division of the total number of available quantizing bits between the number of spectrum-dependent quantizing bits and the number of level-dependent quantizing bits in response to the smoothness of the spectrum of the digital input signal, and for providing a division ratio between the number of level-dependent quantizing bits and the total number of available quantizing bits, and a complement of the division ratio,
a means for multiplying the number of spectrum-dependent quantizing bits for each band by the complement of the division ratio, and
a means for multiplying the number of level-dependent quantizing bits for each band by the division ratio; and
the quantizing means is for quantizing each spectral coefficient in a band using a number of quantizing bits equal to the sum of the multiplied number of spectrum-dependent quantizing bits allocated for quantizing each spectral coefficient in the band and the multiplied number of level-dependent quantizing bits allocated for quantizing each spectral coefficient in the band.

17. The apparatus of claim 9, wherein:
a total number of available quantizing bits is available for quantizing all the spectral coefficients;
the digital input signal has a spectrum, and the spectrum has a smoothness;
the apparatus additionally comprises a division ratio determining means for determining a division of the total number of available quantizing bits between the number of spectrum-dependent quantizing bits and the number of level-dependent quantizing bits in response to the smoothness of the spectrum of the digital input signal, and for providing a division ratio between the number of level-dependent quantizing bits and the total number of available quantizing bits, and a complement of the division ratio;
the number of spectrum-dependent quantizing bits allocated among the bands by the adaptive bit allocation means is substantially proportional to the complement of the division ratio; and
the number of level-dependent quantizing bits allocated among the bands by the fixed bit allocation means is substantially proportional to the division ratio.

18. The apparatus of claim 17, wherein:
the level-dependent bit allocation means is for allocating level-dependent quantizing bits among the bands according to a selected bit allocation pattern; and
the apparatus additionally comprises:
a means for storing plural predetermined bit allocation patterns, the predetermined bit allocation patterns allocating numbers of level-dependent quantizing bits corresponding to different values of the division ratio, and
an additional selecting means for selecting, in response to the digital input signal, and in response to the division ratio, and for providing to the level-dependent bit allocating means as the selected bit allocation pattern, an appropriate one of the plural predetermined bit allocation patterns.

19. The apparatus of claim 1, wherein the means for deriving plural spectral coefficients comprises:
a frequency dividing means for receiving the digital input signal and for dividing the digital input signal into plural frequency ranges, and for providing a frequency range signal in each frequency range;
a time dividing means for dividing in time a frequency range signal into blocks; and
an orthogonal transform means for transforming a block of the frequency range signal to provide the plural spectral coefficients.

20. A method for compressing a digital input signal to provide a compressed digital output signal, the method comprising the steps of:
deriving plural spectral coefficients from the digital input signal, and grouping the spectral coefficients into bands, each band having a band magnitude and a band frequency; and
adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to the band magnitude, weighted depending on the band frequency.

21. The method of claim 20, wherein, in the allocating step, the band magnitude is weighted depending on the band frequency such that the number of spectrum-dependent quantizing bits allocated to lower frequency bands for a given band magnitude is increased.

22. The method of claim 20, wherein:
the method additionally comprises the steps of:
determining, for each band, the band magnitude in response to the spectral coefficients in the band, and
weighting, for each band, the band magnitude depending on the band frequency to provide a weighted band magnitude; and
in the allocating step, the number of spectrum-dependent quantizing bits for quantizing each spectral coefficient in the band is allocated to each band in response to the weighted band magnitude for the band.

23. The method of claim 20, wherein, in the allocating step, the band magnitude for each band is weighted by a weighting coefficient dependent on the digital input signal and the band frequency.

24. The method of claim 20, wherein:
in the allocating step, the band magnitude for each band is weighted depending on the band frequency according to a selected frequency-dependent weighting pattern; and
the method additionally comprises the steps of:
providing plural frequency-dependent weighting patterns, and
selecting in response to the digital input signal, and providing as the selected frequency-dependent weighting pattern, an appropriate one of the plural frequency-dependent weighting patterns.

25. The method of claim 24, for compressing a digital input signal having a level, wherein, in the selecting step, the appropriate one of the plural frequency-dependent weighting patterns is selected in response to the level of the digital input signal.

26. The method of claim 24, for compressing a digital input signal having a spectrum, wherein, in the selecting step, the appropriate one of the plural frequency-dependent weighting patterns is selected in response to the spectrum of the digital input signal.

27. The method of claim 24, wherein, in the allocating step, the band magnitude is weighted such that the number of spectrum-dependent quantizing bits allocated to lower frequency bands for a given band magnitude is increased.

28. The method of claim 20, additionally comprising the steps of:
allocating a number of level-dependent quantizing bits among the bands according to a predetermined bit allocation pattern defining, for each band, a number of level-dependent quantizing bits allocated for quantizing each spectral coefficient in the band; and
quantizing each spectral coefficient in a band using a number of quantizing bits equal to the sum of the number of spectrum-dependent quantizing bits allocated for quantizing each spectral coefficient in the band and the number of level-dependent quantizing bits allocated for quantizing each spectral coefficient in the band.

29. The method of claim 28, wherein in the step of allocating a number of spectrum-dependent quantizing bits among the bands, the band magnitude is weighted such that the number of spectrum-dependent quantizing bits allocated to lower frequency bands for a given band magnitude is increased.

30. The method of claim 28, wherein:
the method additionally comprises the steps of:
determining, for each band, the band magnitude in response to the spectral coefficients in the band, and
weighting, for each band, the band magnitude depending on the band frequency to provide a weighted band magnitude; and
in the step of allocating a number of spectrum-dependent quantizing bits among the bands, the number of spectrum-dependent quantizing bits for quantizing each spectral coefficient in the band is allocated to each band in response to the weighted band magnitude.

31. The method of claim 28, wherein, in the step of allocating a number of spectrum-dependent quantizing bits among the bands, the band magnitude for each band is weighted by a weighting coefficient dependent on the digital input signal and the band frequency.

32. The method of claim 28, wherein:
in the step of allocating a number of spectrum-dependent quantizing bits among the bands, the band magnitude is weighted depending on the band frequency according to a selected frequency-dependent weighting pattern; and
the method additionally comprises the steps of:
providing plural frequency-dependent weighting patterns, and
selecting in response to the digital input signal, and providing as the selected frequency-dependent weighting pattern, an appropriate one of the plural frequency-dependent weighting patterns.

33. The method of claim 32, wherein, in the step of allocating a number of spectrum-dependent quantizing bits among the bands, the band magnitude is weighted such that the number of spectrum-dependent quantizing bits allocated to lower frequency bands for a given band magnitude is increased.

34. The method of claim 28, wherein:
in the step of allocating a number of level-dependent quantizing bits among the bands, level-dependent quantizing bits are allocated among the bands according to a selected bit allocation pattern; and
the method additionally comprises the steps of:
providing plural predetermined bit allocation patterns, and
selecting in response to the digital input signal, and providing as the selected bit allocation pattern, an appropriate one of the plural predetermined bit allocation patterns.

35. The method of claim 28, for compressing a digital input signal having a spectrum, the spectrum having a smoothness, and using a total number of available quantizing bits for quantizing all the spectral coefficients, wherein:
the method additionally comprises:
determining a division of the total number of available quantizing bits between the number of spectrum-dependent quantizing bits and the number of level-dependent quantizing bits in response to the smoothness of the spectrum of the digital input signal, providing in response to the determined division a division ratio between the number of level-dependent quantizing bits and the total number of available quantizing bits, and a complement of the division ratio, multiplying the number of spectrum-dependent quantizing bits for each band by the complement of the division ratio, and multiplying the number of level-dependent quantizing bits for each band by the division ratio; and in the quantizing step, each spectral coefficient in a band is quantized using a number of quantizing bits equal to the sum of the multiplied number of spectrum-dependent quantizing bits allocated for quantizing each spectral coefficient in the band and the multiplied number of level-dependent quantizing bits allocated for quantizing each spectral coefficient in the band.

36. The method of claim 28, for compressing a digital input signal having a spectrum, the spectrum having a smoothness, and using a total number of available quantizing bits for quantizing all the spectral coefficients, wherein:

the method additionally comprises:

determining a division of the total number of available quantizing bits between the number of spectrum-dependent quantizing bits and the number of level-dependent quantizing bits in response to the smoothness of the spectrum of the digital input signal, and providing in response to the determined division a division ratio between the number of level-dependent quantizing bits and the total number of available quantizing bits, and a complement of the division ratio;

in the step of allocating a number of spectrum-dependent quantizing bits among the bands, the number of spectrum-dependent quantizing bits allocated among the bands is substantially proportional to the complement of the division ratio; and in the step of allocating a number of level-dependent quantizing bits among the bands, the number of level-dependent quantizing bits allocated among the bands is substantially proportional to the division ratio.

37. The method of claim 36, wherein:

in the step of allocating a number of level-dependent quantizing bits among the bands, level-dependent quantizing bits are allocated among the bands according to a selected bit allocation pattern; and the method additionally comprises the steps of:

providing plural predetermined bit allocation patterns, the predetermined bit allocation patterns allocating numbers of level-dependent quantizing bits corresponding to different values of the division ratio, and selecting in response to the digital input signal, and in response to the division ratio, and providing as the selected bit allocation pattern, an appropriate one of the plural predetermined bit allocation patterns.

38. The method of claim 20, wherein the step of deriving plural spectral coefficients from the digital input signal comprises the steps of:

dividing the digital input signal into plural frequency ranges, and providing a frequency range signal in each frequency range;

dividing a frequency range signal in time into blocks; and orthogonally transforming a block of the frequency range signal to provide the plural spectral coefficients.

39. A medium whereon is stored a compressed digital signal derived from a digital input signal by a data compressing method comprising the steps of:

deriving plural spectral coefficients from the digital input signal, and grouping the spectral coefficients into bands, each band having a band magnitude and a band frequency;

adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to the band magnitude, weighted depending on the band frequency;

quantizing each spectral coefficient in each band using a number of quantizing bits including the number of spectrum-dependent quantizing bits allocated for quantizing each spectral coefficient in the band; and including the quantized spectral coefficients in the compressed digital signal.

40. The medium of claim 39, wherein, in the allocating step of the data compressing method, the band magnitude is weighted depending on the band frequency such that the number of spectrum-dependent quantizing bits allocated to lower frequency bands for a given band magnitude is increased.

41. The medium of claim 39, wherein, in the data compressing method:

the method additionally comprises the steps of:

determining, for each band, the band magnitude in response to the spectral coefficients in the band, and weighting, for each band, the band magnitude depending on the band frequency to provide a weighted band magnitude; and in the allocating step, the number of spectrum-dependent quantizing bits for quantizing each spectral coefficient in the band is allocated to each band in response to the weighted band magnitude for the band.

42. The medium of claim 39, wherein, in the allocating step of the data compressing method, the band magnitude for each band is weighted by a weighting coefficient dependent on the digital input signal and the band frequency.

43. The medium of claim 39, wherein, in the data compressing method:

in the allocating step, the band magnitude for each band is weighted depending on the band frequency according to a selected frequency-dependent weighting pattern; and the method additionally comprises the steps of:

providing plural frequency-dependent weighting patterns, and selecting in response to the digital input signal, and providing as the selected frequency-dependent weighting pattern, an appropriate one of the plural frequency-dependent weighting patterns.

44. The medium of claim 39, wherein, in the data compressing method:

the method additionally comprises the step of allocating a number of level-dependent quantizing bits among the bands according to a predetermined bit allocation pattern defining, for each band, a number of level-dependent quantizing bits allocated for quantizing each spectral coefficient in the band; and in the quantizing step, each spectral coefficient in each band is quantized using a number of quantizing bits equal to the sum of the number of spectrum-dependent quantizing bits allocated for quantizing each spectral coefficient in the band and the number of level-dependent quantizing bits allocated for quantizing each spectral coefficient in the band.

45. The medium of claim 44, wherein in the step in the data compressing method of allocating a number of spectrum-dependent quantizing bits among the bands, the band magnitude is weighted such that the number of spectrum-dependent quantizing bits allocated to lower frequency bands for a given band magnitude is increased.

46. The medium of claim 44, wherein, in the data compressing method:
the method additionally comprises the steps of:
determining, for each band, the band magnitude in response to the spectral coefficients in the band, and
weighting, for each band, the band magnitude depending on the band frequency to provide a weighted band magnitude; and
in the step of allocating a number of spectrum-dependent quantizing bits among the bands, the number of spectrum-dependent quantizing bits for quantizing each spectral coefficient in the band is allocated to each band in response to the weighted band magnitude.

47. The medium of claim 44, wherein, in the step in the data compressing method of allocating a number of spectrum-dependent quantizing bits among the bands, the band magnitude for each band is weighted by a weighting coefficient dependent on the digital input signal and the band frequency.

48. The medium of claim 44, wherein, in the data compressing method:
in the step of allocating a number of spectrum-dependent quantizing bits among the bands, the band magnitude is weighted depending on the band frequency according to a selected frequency-dependent weighting pattern; and
the method additionally comprises the steps of:
providing plural frequency-dependent weighting patterns, and
selecting in response to the digital input signal, and providing as the selected frequency-dependent weighting pattern, an appropriate one of the plural frequency-dependent weighting patterns.

49. The medium of claim 44, wherein, in the data compressing method:
in the step of allocating a number of level-dependent quantizing bits among the bands, level-dependent quantizing bits are allocated among the bands according to a selected bit allocation pattern; and
the method additionally comprises the steps of:
providing plural predetermined bit allocation patterns, and
selecting in response to the digital input signal, and providing as the selected bit allocation pattern, an appropriate one of the plural predetermined bit allocation patterns.

50. The medium of claim 44, wherein the data compressing method is for compressing a digital input signal having a spectrum, the spectrum having a smoothness, and the method uses a total number of available quantizing bits for quantizing all the spectral coefficients, wherein:
the method additionally comprises:
determining a division of the total number of available quantizing bits between the number of spectrum-dependent quantizing bits and the number of level-dependent quantizing bits in response to the smoothness of the spectrum of the digital input signal,
providing in response to the determined division a division ratio between the number of level-dependent quantizing bits and the total number of available quantizing bits, and a complement of the division ratio,
multiplying the number of spectrum-dependent quantizing bits for each band by the complement of the division ratio, and
multiplying the number of level-dependent quantizing bits for each band by the division ratio; and
in the quantizing step, each spectral coefficient in a band is quantized using a number of quantizing bits equal to the sum of the multiplied number of spectrum-dependent quantizing bits allocated for quantizing each spectral coefficient in the band and the multiplied number of level-dependent quantizing bits allocated for quantizing each spectral coefficient in the band.

51. The medium of claim 39, wherein, in the data compressing method, the step of deriving plural spectral coefficients from the digital input signal comprises the steps of:
dividing the digital input signal into plural frequency ranges, and providing a frequency range signal in each frequency range;
dividing a frequency range signal in time into blocks; and
orthogonally transforming a block of the frequency range signal to provide the plural spectral coefficients.

52. The medium of claim 39, wherein the medium is selected from a group including an optical disc, a semiconductor memory, and a magnetic tape.

53. An expander for expanding a compressed digital signal derived from a digital input signal by a data compressing method comprising the steps of:
deriving plural spectral coefficients from the digital input signal, and grouping the spectral coefficients into bands, each band having a band magnitude and a band frequency,
adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to the band magnitude, weighted depending on the band frequency,
quantizing each spectral coefficient in each band using a number of quantizing bits including the number of spectrum-dependent quantizing bits allocated for quantizing each spectral coefficient in the band, and including in the compressed digital signal, for each band, the quantized spectral coefficients and data indicating the number of quantizing bits, the expander including:
- a means for separating from the compressed digital signal, for each band, the quantized spectral coefficients and the data indicating the number of quantizing bits;
- a means for dequantizing, for each band, the quantized spectral coefficients in response to the data indicating the number of quantizing bits; and
- a means for deriving the output signal from the dequantized spectral coefficients.

54. The expander of claim 53, wherein, in the allocating step of the data compressing method, the band magnitude is weighted depending on the band frequency such that the number of spectrum-dependent quantizing bits allocated to lower frequency bands for a given band magnitude is increased.

55. The expander of claim 53, wherein, in the data compressing method:
the method additionally comprises the steps of:
- determining, for each band, the band magnitude in response to the spectral coefficients in the band, and
- weighting, for each band, the band magnitude depending on the band frequency to provide a weighted band magnitude; and in the allocating step, the number of spectrum-dependent quantizing bits for quantizing each spectral coefficient in the band is allocated to each band in response to the weighted band magnitude for the band.

56. The expander of claim 53, wherein, in the allocating step of the data compressing method, the band magnitude for each band is weighted by a weighting coefficient dependent on the digital input signal and the band frequency.

57. The expander of claim 53, wherein, in the data compressing method:
in the allocating step, the band magnitude for each band is weighted depending on the band frequency according to a selected frequency-dependent weighting pattern; and
the method additionally comprises the steps of:
- providing plural frequency-dependent weighting patterns, and
- selecting in response to the digital input signal, and providing as the selected frequency-dependent weighting pattern, an appropriate one of the plural frequency-dependent weighting patterns.

58. The expander of claim 53, wherein, in the data compressing method:
the method additionally comprises the step of allocating a number of level-dependent quantizing bits among the bands according to a predetermined bit allocation pattern defining, for each band, a number of level-dependent quantizing bits allocated for quantizing each spectral coefficient in the band; and
in the quantizing step, each spectral coefficient in each band is quantized using a number of quantizing bits equal to the sum of the number of spectrum-dependent quantizing bits allocated for quantizing each spectral coefficient in the band and the number of level-dependent quantizing bits allocated for quantizing each spectral coefficient in the band.

59. The expander of claim 58, wherein in the step in the data compressing method of allocating a number of spectrum-dependent quantizing bits among the bands, the band magnitude is weighted such that the number of spectrum-dependent quantizing bits allocated to lower frequency bands for a given band magnitude is increased.

60. The expander of claim 58, wherein, in the data compressing method:
the method additionally comprises the steps of:
- determining, for each band, the band magnitude in response to the spectral coefficients in the band, and
- weighting, for each band, the band magnitude depending on the band frequency to provide a weighted band magnitude; and in the step of allocating a number of spectrum-dependent quantizing bits among the bands, the number of spectrum-dependent quantizing bits for quantizing each spectral coefficient in the band is allocated to each band in response to the weighted band magnitude.

61. The expander of claim 58, wherein, in the step in the data compressing method of allocating a number of spectrum-dependent quantizing bits among the bands, the band magnitude for each band is weighted by a weighting coefficient dependent on the digital input signal and the band frequency.

62. The expander of claim 58, wherein, in the data compressing method:
in the step of allocating a number of spectrum-dependent quantizing bits among the bands, the band magnitude is weighted depending on the band frequency according to a selected frequency-dependent weighting pattern; and
the method additionally comprises the steps of:
- providing plural frequency-dependent weighting patterns, and
- selecting in response to the digital input signal, and providing as the selected frequency-dependent weighting pattern, an appropriate one of the plural frequency-dependent weighting patterns.

63. The expander of claim 58, wherein, in the data compressing method:
in the step of allocating a number of level-dependent quantizing bits among the bands, level-dependent quantizing bits are allocated among the bands according to a selected bit allocation pattern; and
the method additionally comprises the steps of:
- providing plural predetermined bit allocation patterns, and
- selecting in response to the digital input signal, and providing as the selected bit allocation pattern, an appropriate one of the plural predetermined bit allocation patterns.

64. The expander of claim 58, wherein the data compressing method is for compressing a digital input signal having a spectrum, the spectrum having a smoothness, and the method uses a total number of available quantizing bits for quantizing all the spectral coefficients, wherein:
the method additionally comprises:
- determining a division of the total number of available quantizing bits between the number of spectrum-dependent quantizing bits and the number of level-dependent quantizing bits in response to the smoothness of the spectrum of the digital input signal, providing in response to the determined division a division ratio between the number of level-dependent quantizing bits and the total number of available quantizing bits, and a complement of the division ratio, multiplying the number of spectrum-dependent quantizing bits for each band by the complement of the division ratio, and multiplying the number of level-dependent quantizing bits for each band by to the division ratio; and in the quantizing step, each spectral coefficient in a band is quantized using a number of quantizing bits equal to the sum of the multiplied number of spectrum-dependent quantizing bits allocated for quantizing each spectral coefficient in the band and the multiplied number of level-dependent quantizing bits allocated for quantizing each spectral coefficient in the band.

65. The expander of claim 53, wherein, in the data compressing method, the step of deriving plural spectral coefficients from the digital input signal comprises the steps of:

dividing the digital input signal into plural frequency ranges, and providing a frequency range signal in each frequency range;

dividing a frequency range signal in time into blocks; and orthogonally transforming a block of the frequency range signal to provide the plural spectral coefficients.

* * * * *